M. A. RITTER & S. M. McCORKLE.
BALING PRESS.
APPLICATION FILED MAY 16, 1908.
924,107.
Patented June 8, 1909.
2 SHEETS—SHEET 1.
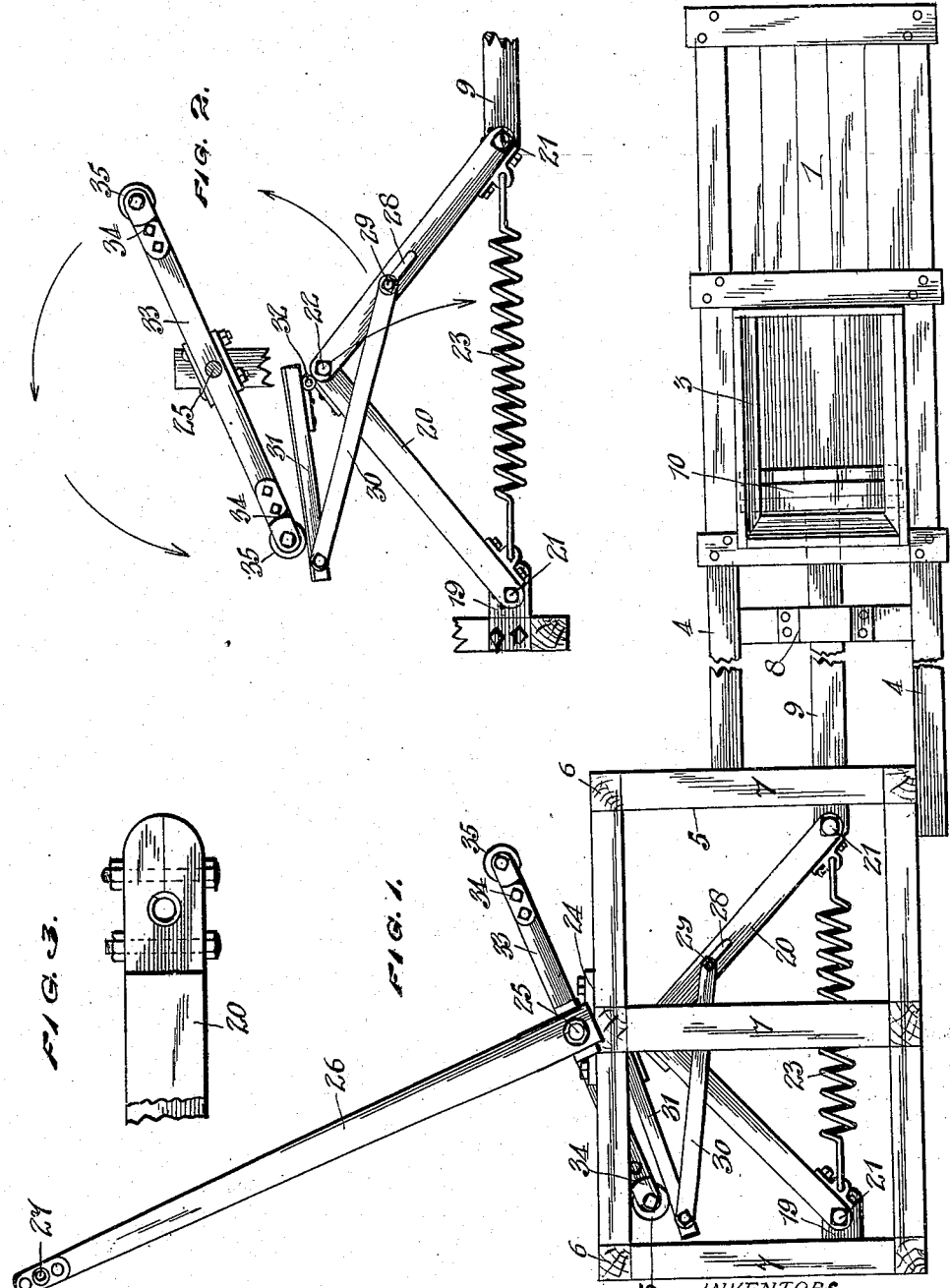
WITNESSES
Chas. K. Davis
Myron G. Clea
INVENTORS
M. A. Ritter
S. M. McCorkle
By C. L. Parker, Attorney
THE NORRIS PETERS CO., WASHINGTON, D. C.

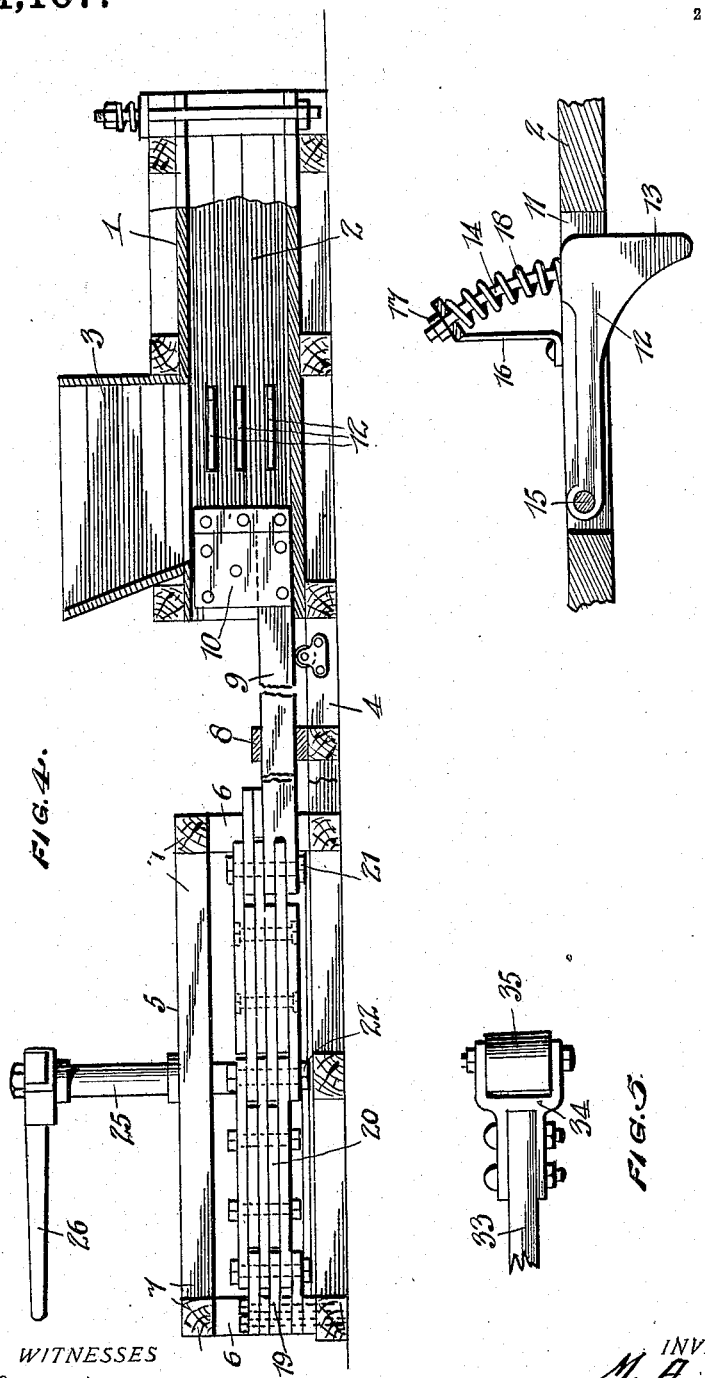

UNITED STATES PATENT OFFICE.

MOSES A. RITTER AND STEPHEN M. McCORKLE, OF FOSS, OKLAHOMA, ASSIGNORS, BY DIRECT AND MESNE ASSIGNMENTS, TO FOSS MANUFACTURING COMPANY, OF FOSS, OKLAHOMA, A COPARTNERSHIP.

BALING-PRESS.

No. 924,107.     Specification of Letters Patent.     Patented June 8, 1909.

Application filed May 16, 1908. Serial No. 433,291.

*To all whom it may concern:*

Be it known that we, MOSES A. RITTER and STEPHEN M. MCCORKLE, citizens of the United States, residing at Foss, in the county of Washita and State of Oklahoma, have invented certain new and useful Improvements in Baling-Presses, of which the following is a specification.

Our invention relates to baling presses, and more particularly to the operating mechanism thereof, and our object is to provide a more efficient construction and arrangement of parts than has heretofore been contemplated.

Further objects and advantages of our invention will be set forth in the following description, in which reference is made to the accompanying drawings forming a part of this specification, in which like numerals are used to designate like parts throughout the several figures, and in which, Figure 1 is a plan view of our improved baling press. Fig. 2 is a detail plan view of our improved plunger operating mechanism removed. Fig. 3 is a fragmentary detail view of one end of one of the toggle levers, on an enlarged scale. Fig. 4 is a vertical longitudinal sectional view taken through our improved baling press shown in Fig. 1. Fig. 5 is a fragmentary detail view of one end of the toggle operating roller arm, and Fig. 6 is a fragmentary horizontal sectional view taken through one wall of the baling chamber, and illustrating one of the bale holding dogs.

In the practical embodiment of our invention, we provide a closed baling box or chamber 1, having side walls 2, and provided adjacent its rear end with a receiving hopper 3, said baling chamber being connected by spaced side timbers 4, with a rectangular skeleton frame 5, comprising vertical timbers 6 and horizontal timbers 7. Extending from the skeleton frame 4, and through a bearing 8 formed transversely between the connecting timbers 4, is a compressing plunger 9, having an enlarged head 10 slidably fitting within the baling chamber 1.

Pivotally mounted within slotted openings 11, in the side walls 2 of the baling chamber 1, in opposing relation, are series of horizontal swinging bale holding dogs 12, having their forward angular inwardly projecting ends 13 arranged substantially in vertical alinement with the front wall of the receiving hopper 3, said angular ends 13 having curved faces opposing the plunger head 10, whereby the same will be swung outwardly upon the forward movement of said plunger bearing, thereagainst. The said dogs 12 are provided upon their outer sides with outwardly projecting bolts 14, curved upon a radii corresponding to their swinging movement upon their pivot 15, and having their outer ends projecting through apertured brackets 16. The bolts 14 are further provided upon their outer ends beyond said brackets 16, with nuts 17 to limit the inward movement of said dogs, and with encircling coil springs 18 between said dogs and said brackets, tending to force said dogs inwardly. Thus it will be seen, material having been introduced through the hopper 3, the forward movement of the plunger 9 presses said material forwardly within the chamber 1, and engages the curved opposing faces of the dogs 12, swinging the same outwardly and allowing the material to be pressed inwardly thereof. It will further be seen that upon the rearward movement of the plunger head 10, the springs 18 will force said dogs 12 inwardly to engage rearwardly of the compressed bale, and maintain the same in its compact form.

When in its rearward position, the rear end of the plunger 9 projects slightly within the rectangular skeleton frame 5, which frame is provided in its opposite end, and in alinement with said plunger, with a pivot block 19, bolted thereto, and connected to the rear end of said plunger by a toggle 20, the arms of which are pivotally connected upon their outer ends to said pivot block 19, and the rear end of said plunger 9 by bolts 21, and the inner adjacent ends of which are pivoted by bolt 22. Adjacent their outer ends, the arms of the toggle 22 are connected by a retractile coil spring 23, which normally maintains said toggle arms in their angular relation, and the plunger 9 in its rearward position.

Mounted at one side of the skeleton frame 5, in brackets 24, is a vertical shaft 25, provided upon its upper end above said frame 5, with a draft bar 26, the outer end 27 of which is adapted to be moved in a circular path about the vertical shaft 25, to rotate the same, by means of a suitable draft animal attached thereto. The forward one of the arms of the toggle 20 is provided with a slotted opening 28, intermediate its ends, within which the end bolt 29 of a reach rod 30, slides, the rear end of said reach rod being pivotally connected to the rear end of a treadle arm 31, hinged at its forward end by a hinge 32, to the opposite one of the arms of the toggle 20, adjacent the inner pivot 22 thereof. The vertical shaft 25 is provided intermediate its ends, with a rigid operating arm 33 secured thereto intermediate its ends and provided upon its extremities with brackets 34 in which are transversely journaled rollers 35. Said operating arm 33 is thus movable in a circular path upon the circular movement of the draft bar 26, and projects within the skeleton frame 5 and into contact with the treadle arm 31. Thus upon the inward engagement of the rollers 35 of the operating arm 33, against the treadle arm 31, adjacent the outer end thereof, as shown in Fig. 2, the said outer end will be forced away from the same, thus moving the reach rod 30 longitudinally, which reach rod by virtue of its movable non-binding connection with the forward arm of the toggle 20, causes the initial movement of said toggle and thus obviates any tendency of the operating arm 33 to bind with the said toggle 20 when the treadle arm 31 has been swung inwardly thereagainst and direct pressure is applied thereto.

Having fully described our invention, we claim:

1. In a baling press of the character described, the combination of a baling chamber, a longitudinally reciprocatory plunger operating therein, a toggle for reciprocating said plunger, a rotatable member arranged to indirectly exert pressure upon the said toggle during its rotation, and means carried by said toggle and against which said rotatable member directly engages, for imparting movement to said toggle before the indirect pressure of said member thereupon, substantially as described.

2. In a baling press of the character described, the combination of a baling chamber, a longitudinally reciprocatory plunger operating therein, a toggle for reciprocating said plunger, a rotatable member arranged to indirectly exert pressure upon the toggle during its rotation, and means carried by said toggle and against which said rotatable member directly engages, for imparting movement to said toggle, before the indirect pressure of said member thereagainst, said means having initial movement under the operation of said member, and independent of said toggle, substantially as described.

3. In a baling press of the character described, the combination of a baling chamber, a longitudinally reciprocatory plunger, operating therein, a stationary member in alinement with said plunger, a toggle connecting the outer ends of said plunger, with said stationary member, a rotatable member arranged to indirectly exert pressure upon said toggle during its rotation, means carried by said toggle and against which said rotatable member directly engages, for imparting movement to said toggle before the indirect pressure of said member thereupon, and a retractile spring extending between the said outer end of said plunger, and the said stationary member, substantially as described.

4. In a baling press of the character described, the combination of a baling chamber, a longitudinally reciprocatory plunger operating therein, a stationary member in alinement with said plunger, a toggle connecting the outer end of said plunger, with the said stationary member, a rotatable member arranged to indirectly exert pressure upon said toggle during its rotation, means carried by said toggle and against which said rotatable member directly engages, for imparting movement to the said toggle during the pressure of said member thereupon, said means having initial movement under the operation of said member, and independent of said toggle, and a retractile spring extending between the said stationary member and the said outer end of said plunger, substantially as described.

In testimony whereof we affix our signatures in presence of two witnesses.

MOSES A. RITTER.
STEPHEN M. McCORKLE.

Witnesses:
CHAS. M. HOOVER,
W. A. SHAW.